(12) United States Patent
Lee

(10) Patent No.: US 8,792,006 B2
(45) Date of Patent: Jul. 29, 2014

(54) METHOD AND SYSTEM FOR DETECTING ERROR OF AUTO FOCUS CALIBRATION

(71) Applicant: LG Innotek Co., Ltd., Seoul (KR)

(72) Inventor: In Jae Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 31 days.

(21) Appl. No.: 13/687,969

(22) Filed: Nov. 28, 2012

(65) Prior Publication Data

US 2013/0135517 A1 May 30, 2013

(30) Foreign Application Priority Data

Nov. 29, 2011 (KR) .................. 10-2011-0125598

(51) Int. Cl.
*H04N 17/00* (2006.01)
*H04N 5/232* (2006.01)
*H04N 5/225* (2006.01)
*G02B 15/14* (2006.01)
*G01C 3/08* (2006.01)

(52) U.S. Cl.
USPC ............ 348/187; 348/180; 348/345; 348/335; 359/698; 356/4.04

(58) Field of Classification Search
CPC ............ H04N 17/002; H04N 5/23212; H04N 5/2254; G02B 7/028; G02B 7/09; G01C 3/04

USPC .......... 348/180, 187, 188, 345, 335; 359/641, 359/642, 694, 698; 356/4.04
See application file for complete search history.

(56) References Cited

U.S. PATENT DOCUMENTS

| 5,856,664 | A * | 1/1999 | Suzuki et al. | 356/11 |
| 6,002,467 | A * | 12/1999 | Nishi et al. | 355/61 |
| 8,049,780 | B2 * | 11/2011 | Hofmann et al. | 348/187 |
| 8,339,463 | B2 * | 12/2012 | Wang et al. | 348/187 |
| 2009/0202235 | A1 * | 8/2009 | Li et al. | 348/345 |
| 2010/0040355 | A1 * | 2/2010 | Craen et al. | 396/90 |
| 2012/0169885 | A1 * | 7/2012 | Wang et al. | 348/180 |

* cited by examiner

*Primary Examiner* — Nhan T Tran

(74) *Attorney, Agent, or Firm* — Birch, Stewart, Kolasch & Birch, LLP

(57) ABSTRACT

Provided is a method and a system for detecting an error focus calibration, wherein a first DFOV value is measured in a state before the collimator lens is interposed between the resolution chart and the camera module, and a second DFOV value is measured in a state after the collimator lens is interposed between the resolution chart and the camera module, a determination is made whether a value obtained by subtracting the second DFOV value from the first DFOV value is smaller than a threshold value, and detecting as an error of auto calibration, in a case the subtracted value is greater than the threshold value.

10 Claims, 7 Drawing Sheets

METHOD AND SYSTEM FOR DETECTING ERROR OF AUTO FOCUS CALIBRATION

Pursuant to 35 U.S.C. §119 (a), this application claims the benefit of earlier filing date and right of priority to Korean Patent Application No. 10-2011-0125598, filed on Nov. 29, 2011, the contents of which is hereby incorporated by reference in their entirety.

BACKGROUND OF THE DISCLOSURE

1. Field of Endeavor

The present disclosure relates to a method and system for detecting error of auto focus calibration.

2. Background

This section provides background information related to the present disclosure which is not necessarily prior art.

Generally, a camera module includes a lens barrel including a lens, a housing assembly coupled to the lens barrel, a sensor unit including an IR (Infrared) filter and an image sensor.

In a case the camera module mounted with an actuator moves the lens barrel to perform an AF (Auto Focusing), a best focusing position is sought after by moving the lens from an infinity to macro.

However, a best-focused lens position at a same distance may vary due to lens deviation of each camera module, deviation in dynamic characteristic of an actuator, tilt and rotation deviations possibly generated in assembly.

Thus, an autofocus calibration is performed where a code corresponding to a best focus lens position for infinity and macro for each camera module is stored in a memory of the camera module.

Referring to FIG. 1, a mobile terminal mounted with a camera module generally performs an autofocus search between an infinity autofocus calibration code and a macro autofocus calibration code stored in the memory of the camera module. At this time, as shown in FIG. 2, a collimator lens (30) is interposed between a resolution chart (10) and a camera module (20) to measure a real distance in a case an infinity autofocus calibration is performed.

However, an error may occur where an infinity autofocus calibration is performed at a position different from a real infinity due to deviation in a collimator lens and erroneous operation.

In a case a code is stored in a memory that is larger than a real infinity best focus code, the mobile terminal is changed in auto focus search section, a focus of an object in infinity and a focus of an object in a position in a particular distance cannot be disadvantageously captured.

SUMMARY OF THE DISCLOSURE

This section provides a general summary of the disclosure, and is not a comprehensive disclosure of its full scope or all of its features.

The present disclosure provides a method and a system for detecting an error of auto focus calibration before implementation of an auto focus calibration.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a system for detecting an error of auto focus calibration; the system comprising: a collimator lens driving unit interposing a collimator lens between a resolution chart and a camera module for measuring a DFOV (Display Field of View) value of infinity; a DFOV measuring and storing unit measuring and storing a first DFOV value in a state prior to the interposition of the collimator lens between the resolution chart and the camera module, and measuring and storing a second DFOV value in a state after the interposition of the collimator lens between the resolution chart and the camera module; and an auto focus calibration error detecting unit determining whether a value obtained by subtracting the second DFOV value from the first DFOV value stored in the DFOV measuring and storing unit is smaller than a threshold value, and detecting as an auto calibration error in a case the subtracted value is greater than the threshold value.

In some exemplary embodiments, the system may include a controller controlling the collimator lens driving unit, the DFOV measuring and storing unit and the auto focus calibration error detecting unit.

In some exemplary embodiments, the controller may output a control signal performing an auto focus calibration, in a case the subtracted value of the auto focus calibration error detecting unit is smaller than the threshold value.

In some exemplary embodiments, the controller may determine that the auto focus calibration is an error, in a case the subtracted value of the auto focus calibration error detecting unit is greater than the threshold value and does not perform the auto focus calibration.

In some exemplary embodiments, the first and second DFOV values may be measured from an image, where the image is the resolution chart photographed by the camera module.

In some exemplary embodiments, the first and second DFOV values may be calculated by $DFOV = a\tan(B/(A/2))*2$, in a case 'A' is a diagonal length (cm) of an image of the resolution chart photographed by the camera module, and 'B' is a distance between the resolution chart and the camera module.

In another general aspect of the present disclosure, there is provided a method for detecting an error of auto focus calibration, the method comprising: measuring a first DFOV (Display Field of View) value, in a state where a resolution chart is spaced apart from a camera module at a predetermined distance; interposing a collimator lens between the resolution chart and the camera module; measuring a second DFOV value, in a state where the collimator lens is interposed between the resolution chart and the camera module; determining whether a difference between the first and second DFOV values is smaller than a threshold value; and performing an auto focus calibration, in a case a difference between the first and second DFOV values is smaller than a threshold value.

In some exemplary embodiments, a determination may be made as the auto focus calibration being an error, in a case a difference between the first and second DFOV values is greater than the threshold value and auto focus calibration is not performed.

In some exemplary embodiments, the first and second DFOV values may be measured from an image of the resolution chart photographed by the camera module.

In some exemplary embodiments, the first and second DFOV values may be calculated by $DFOV = a\tan(B/(A/2))*2$, in a case 'A' is a diagonal length (cm) of an image of the resolution chart photographed by the camera module, and 'B' is a distance between the resolution chart and the camera module.

The present disclosure has an advantageous effect in that an error of auto focus calibration where an erroneous code value is stored is detected before implementation of auto focus calibration, to thereby improve an auto focus characteristics of a camera module, the error being generated by failure to obtain a real infinity due to erroneous operation of collimator lens during infinity auto focus calibration and due to deviation in design error.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
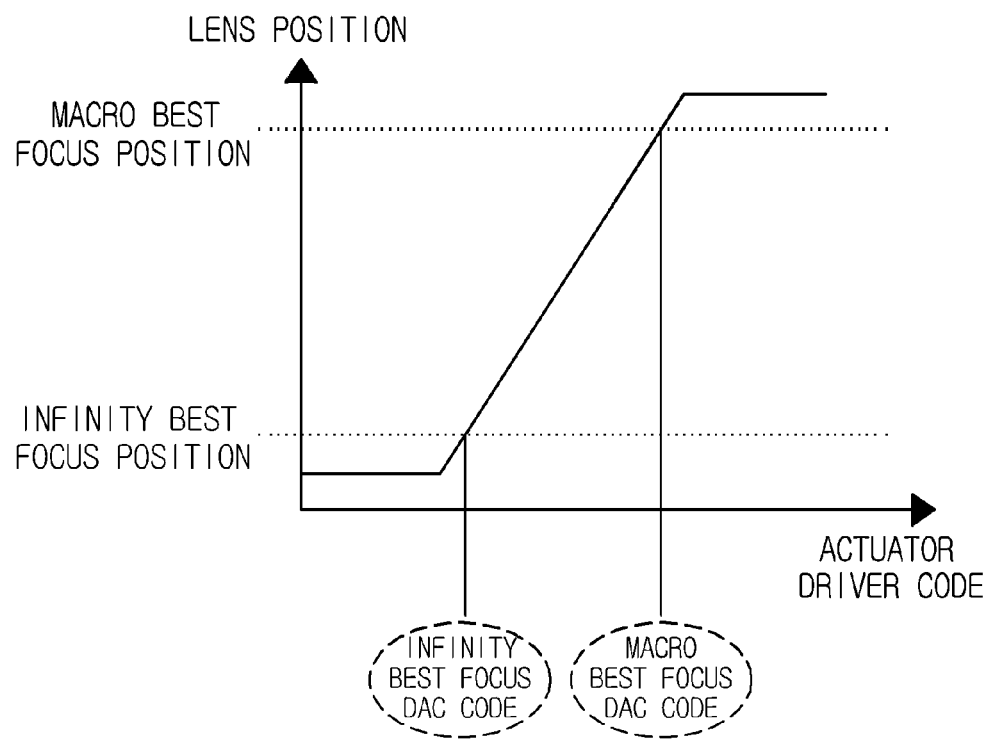
FIG. 1 is a graph explaining an auto focus search range in a camera module according to prior art.
Figure 2:
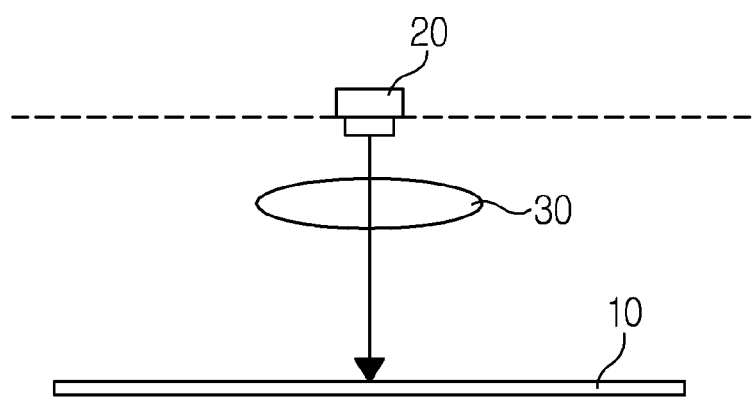
FIG. 2 is a schematic view illustrating a configuration for implementing a infinity auto focus calibration according to prior art.

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. That is, in the drawings, the size and relative sizes of layers, regions and/or other elements may be exaggerated or reduced for clarity. Like numbers refer to like elements throughout and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 3:
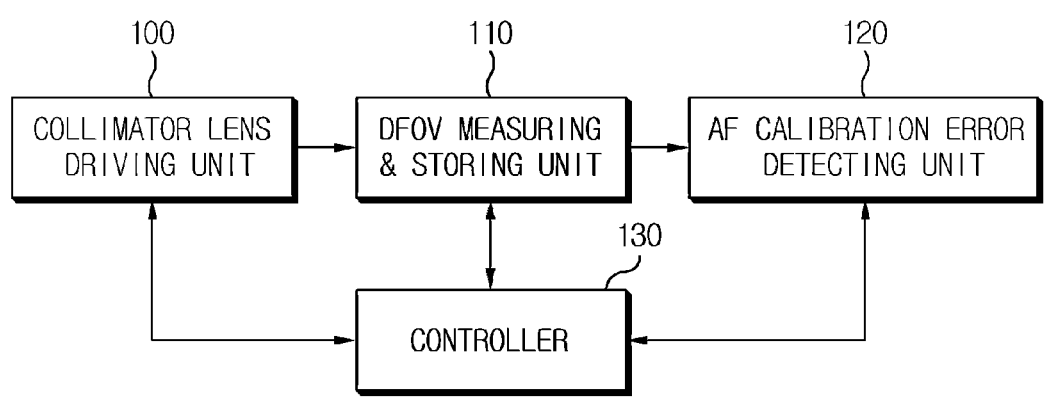
FIG. 3 is a block diagram illustrating a configuration of a system for detecting an error of auto focus calibration according to an exemplary embodiment of the present disclosure.

FIG. 3 is a block diagram illustrating a configuration of a system for detecting an error of auto focus calibration according to an exemplary embodiment of the present disclosure.

The system for detecting an error of auto focus calibration according to an exemplary embodiment of the present disclosure includes a collimator lens driving unit (100) interposing a collimator lens between a resolution chart and a camera module for measuring a DFOV (Display Field of View) value of infinity; a DFOV measuring and storing unit (110) measuring and storing a first DFOV value in a state prior to the interposition of the collimator lens between the resolution chart and the camera module, and measuring and storing a second DFOV value in a state after the interposition of the collimator lens between the resolution chart and the camera module; and an auto focus calibration error detecting unit (120) determining whether a value obtained by subtracting the second DFOV value from the first DFOV value stored in the DFOV measuring and storing unit is smaller than a threshold value, and detecting as an error of an auto calibration in a case the subtracted value is greater than the threshold value.

At this time, the collimator lens driving unit (100), the DFOV measuring and storing unit (110) and the auto focus calibration error detecting unit (120) are controlled by the controller.

That is, in order to measure a DFOV (Display Field of View) value of infinity, the controller (130) applies a control signal to the collimator lens driving unit (100) to drive the collimator lens driving unit (100), such that a collimator lens can be interposed between a resolution chart and a camera module. The controller (130) controls in such a manner that the DFOV measuring and storing unit (110) measures the first and second DFOV values.

Furthermore, the controller (130) controls in such a manner that the auto focus calibration error detecting unit (120) reads the first and second DFOV values stored in the DFOV measuring and storing unit (110), subtracts the second DFOV value from the first DFOV value, and detects an error of auto focus calibration.

In addition, the controller (130) outputs a control signal for performing an auto focus calibration in a case the subtracted value from the auto focus calibration error detecting unit (120) is smaller than a threshold value.

Thus, the present disclosure has an advantageous effect in that an error of auto focus calibration where an erroneous code value is stored is detected before implementation of auto focus calibration, to thereby improve an auto focus characteristics of a camera module, the error being generated by failure to obtain a real infinity due to erroneous operation of collimator lens during infinity auto focus calibration and due to deviation in design error.

Figure 4:
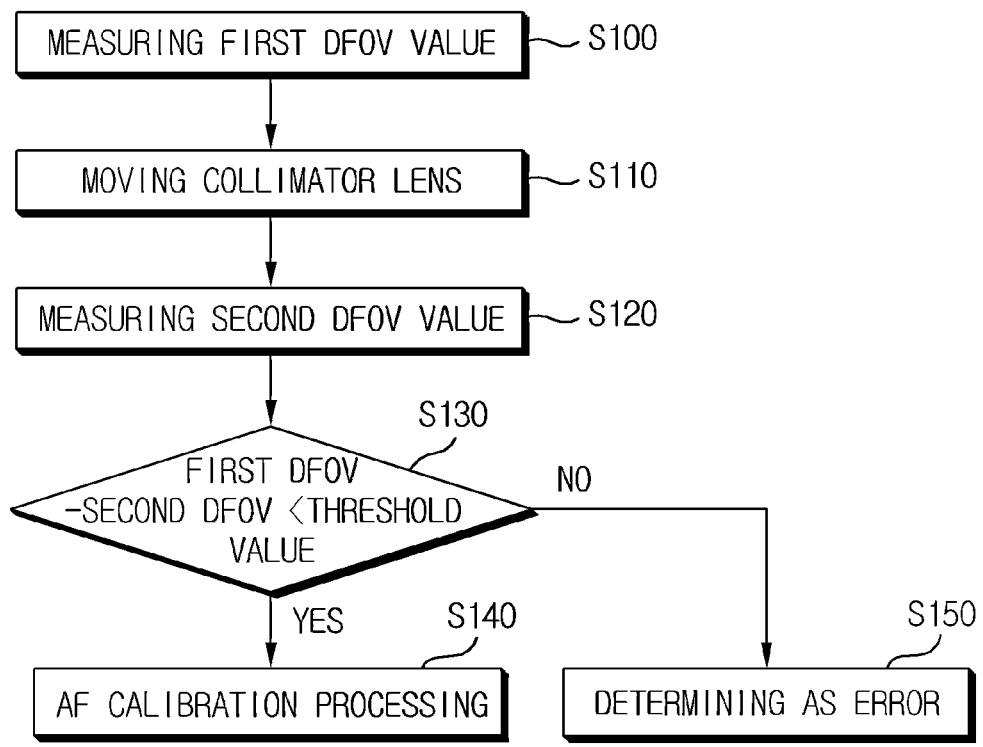
FIG. 4 is a flowchart illustrating a method for detecting an error of auto focus calibration according to an exemplary embodiment of the present disclosure.

FIG. 4 is a flowchart illustrating a method for detecting an error of auto focus calibration according to an exemplary embodiment of the present disclosure.

The method for detecting an error of auto focus calibration according to an exemplary embodiment of the present disclosure is processed in the following manner.

First, a first DFOV (Display Field of View) value is measured, in a state where a resolution chart is spaced apart from a camera module at a predetermined distance (S100).

Thereafter, a collimator lens is interposed between the resolution chart and the camera module (S110). Then, a second DFOV value is measured, in a state where the collimator lens is interposed between the resolution chart and the camera module (S120). Successively, a determination is made whether a difference between the first and second DFOV values is smaller than a threshold value (S130). Next, an auto focus calibration is performed, in a case a difference between the first and second DFOV values is smaller than a threshold value (S140), where a case where a difference between the first and second DFOV values is greater than a threshold value is determined as an error and the auto focus calibration is not performed (S150).

Figure 5:
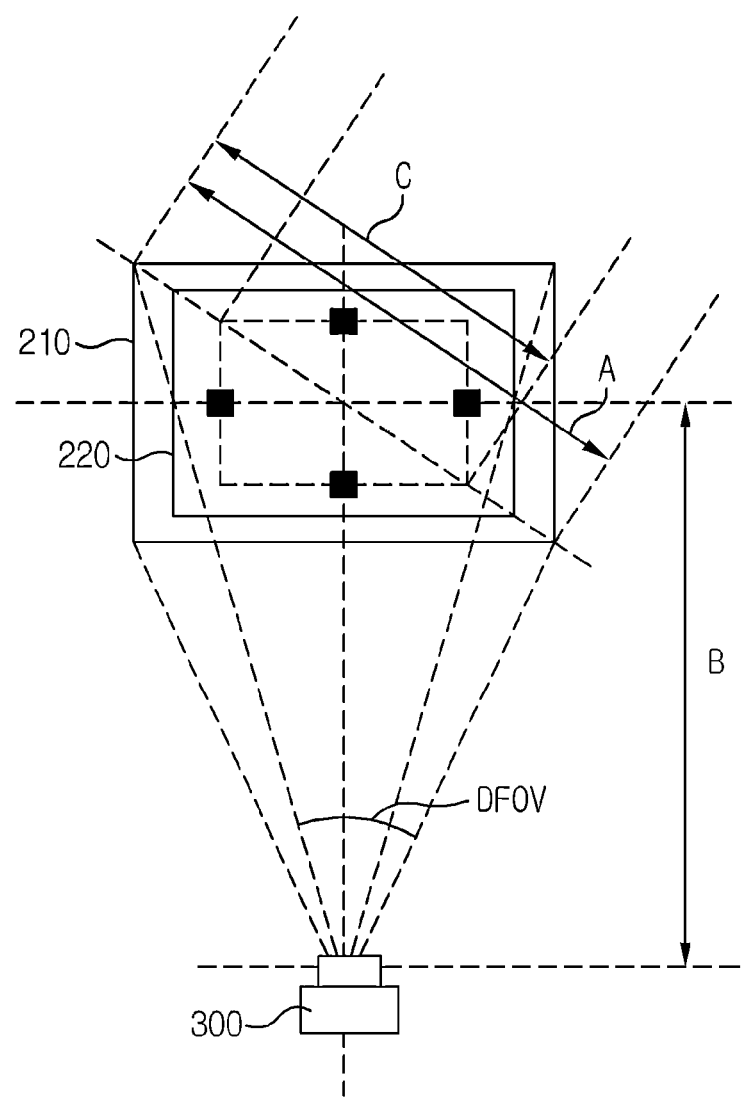
FIG. 5 is a schematic view illustrating a method for measuring a DFOV value according to the present disclosure.
Figure 6A:
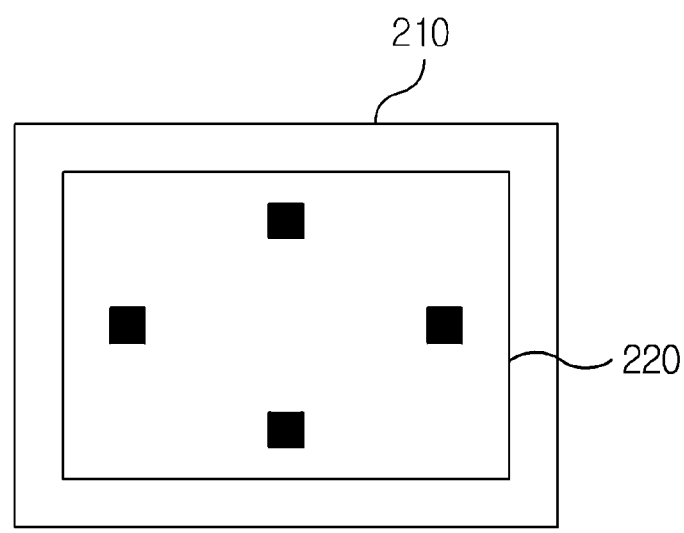
FIGS. 6a and 6b are schematic views illustrating a degree of DFOV value measured according to the present disclosure.
Figure 6B:
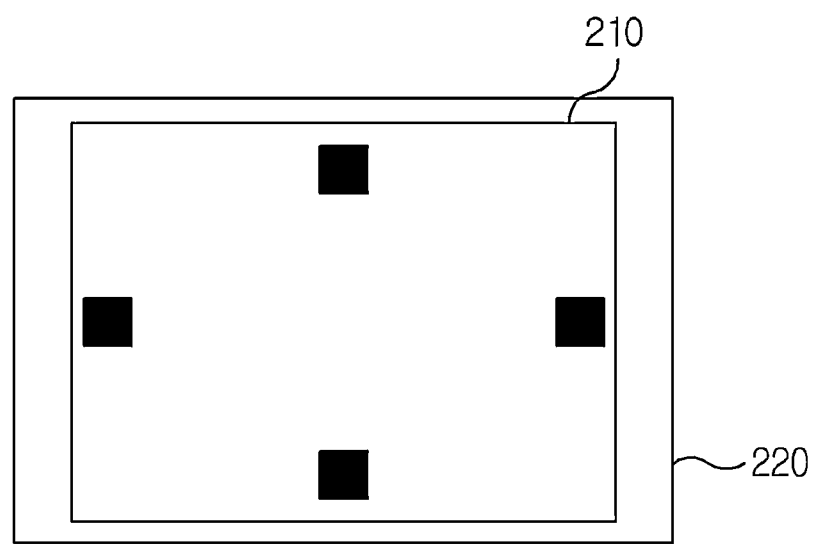
Figure 7A:
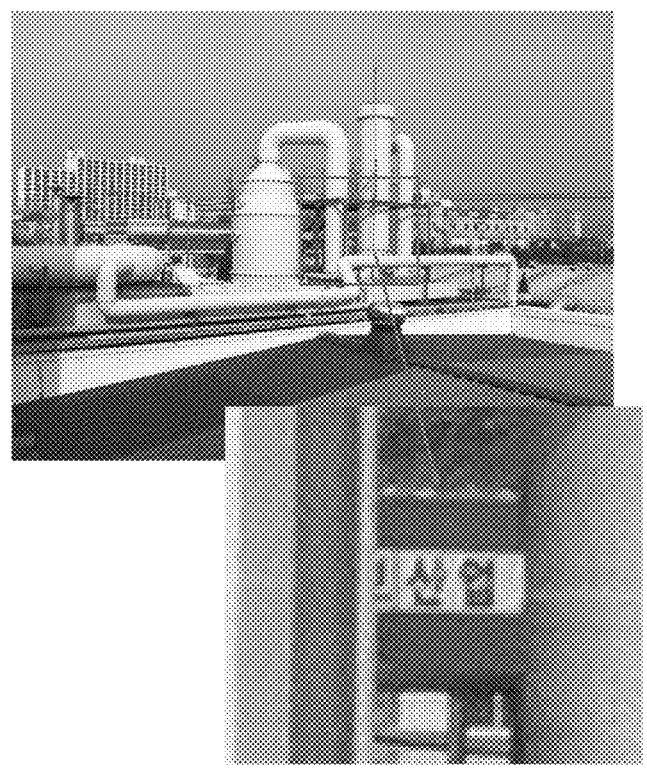
FIGS. 7a and 7b are images of abnormal auto focus calibration and images of normal auto focus calibration photographed by a camera module according to the present disclosure.
Figure 7B:
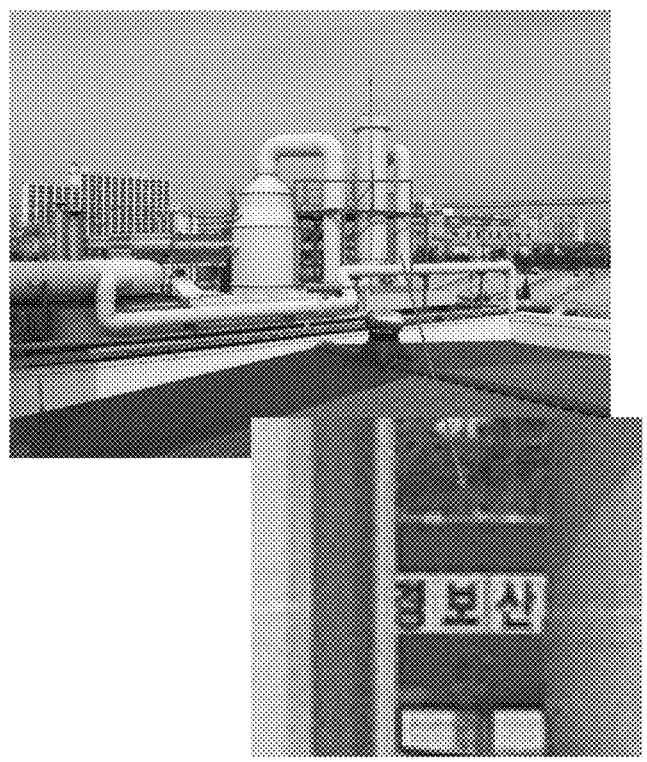

FIG. 5 is a schematic view illustrating a method for measuring a DFOV value according to the present disclosure, FIGS. 6a and 6b are schematic views illustrating a degree of DFOV value measured according to the present disclosure, and FIGS. 7a and 7b are images of abnormal auto focus calibration and images of normal auto focus calibration photographed by a camera module according to the present disclosure.

The aforementioned DFOV value is measured from an image having photographed the resolution chart (220) by a camera module (300), and is calculated as DFOV=a tan(B/(A/2))*2.

At this time, as illustrated in FIG. 5, 'A' is a diagonal length (cm) of an image (210) of the resolution chart (220) photographed by the camera module (300), 'B' is a distance between the resolution chart (20) and the camera module (300), and 'C' is a diagonal length (cm) of a square mark of the resolution chart (220). Furthermore, as illustrated in FIG. 6a, in a case size of an image (210) having photographed the resolution chart (220) by the camera module (300) is greater than size of the resolution chart (220), a degree of measured DFOV value is measured as a great DFOV value.

As illustrated in FIG. 6b, in a case size of an image (210) having photographed the resolution chart (220) by the camera module (300) is smaller than size of the resolution chart (220), a degree of measured DFOV value is measured as a small DFOV value.

Still furthermore, an image photographed by an abnormal camera module where an error of auto focus calibration is generated is not properly performed in auto focus as shown in FIG. 7a, and an image photographed by a normal camera module where auto focus calibration is properly performed can obtain an excellent auto focus calibration as shown in FIG. 7b.

Although the present disclosure has been described with reference to a number of illustrative embodiments thereof, it should be understood that numerous other modifications and embodiments can be devised by those skilled in the art that will fall within the spirit and scope of the principles of this disclosure.

What is claimed is:

1. A system for detecting an error of auto focus calibration comprising: a collimator lens driving unit interposing a collimator lens between a resolution chart and a camera module for measuring a DFOV (Display Field of View) value of infinity; a DFOV measuring and storing unit measuring and storing a first DFOV value in a state before the collimator lens is interposed between the resolution chart and the camera module, and measuring and storing a second DFOV value in a state after the collimator lens is interposed between the resolution chart and the camera module; and an auto focus calibration error detecting unit determining whether a value obtained by subtracting the second DFOV value from the first DFOV value stored in the DFOV measuring and storing unit is smaller than a threshold value, and detecting an error of an auto calibration, in a case the subtracted value is greater than the threshold value.

2. The system of claim 1, further comprising a controller controlling the collimator lens driving unit, the DFOV measuring and storing unit and the auto focus calibration error detecting unit.

3. The system of claim 2, wherein the controller outputs a control signal performing an auto focus calibration, in a case the subtracted value of the auto focus calibration error detecting unit is smaller than the threshold value.

4. The system of claim 2, wherein the controller determines that the auto focus calibration is an error, in a case the subtracted value of the auto focus calibration error detecting unit is greater than the threshold value and does not perform the auto focus calibration.

5. The system of claim 1, wherein the first and second DFOV values are measured from an image, where the image is the resolution chart photographed by the camera module.

6. The system of claim 5, wherein the first and second DFOV values are calculated by DFOV=a tan(B/(A/2))*2, in a case 'A' is a diagonal length (cm) of an image of the resolution chart photographed by the camera module, and 'B' is a distance between the resolution chart and the camera module.

7. A method for detecting an error of auto focus calibration, the method comprising: measuring a first DFOV (Display Field of View) value, in a state where a resolution chart is spaced apart from a camera module at a predetermined distance; interposing a collimator lens between the resolution chart and the camera module; measuring a second DFOV value, in a state where the collimator lens is interposed between the resolution chart and the camera module; determining whether a difference between the first and second DFOV values is smaller than a threshold value; and performing an auto focus calibration, in a case a difference between the first and second DFOV values is smaller than a threshold value.

8. The method of claim 7, wherein a determination is made that the auto focus calibration is an error, in a case a difference between the first and second DFOV values is greater than the threshold value and auto focus calibration is not performed.

9. The method of claim 5, wherein the first and second DFOV values are measured from an image of the resolution chart photographed by the camera module.

10. The method of claim 9, wherein the first and second DFOV values are calculated by DFOV=a tan(B/(A/2))*2, in a case 'A' is a diagonal length (cm) of an image of the resolution chart photographed by the camera module, and 'B' is a distance between the resolution chart and the camera module.

* * * * *